Dec. 29, 1925.
H. C. ZIMMERMAN
BRAKE CONTROL
Filed Sept. 30, 1924
1,567,221
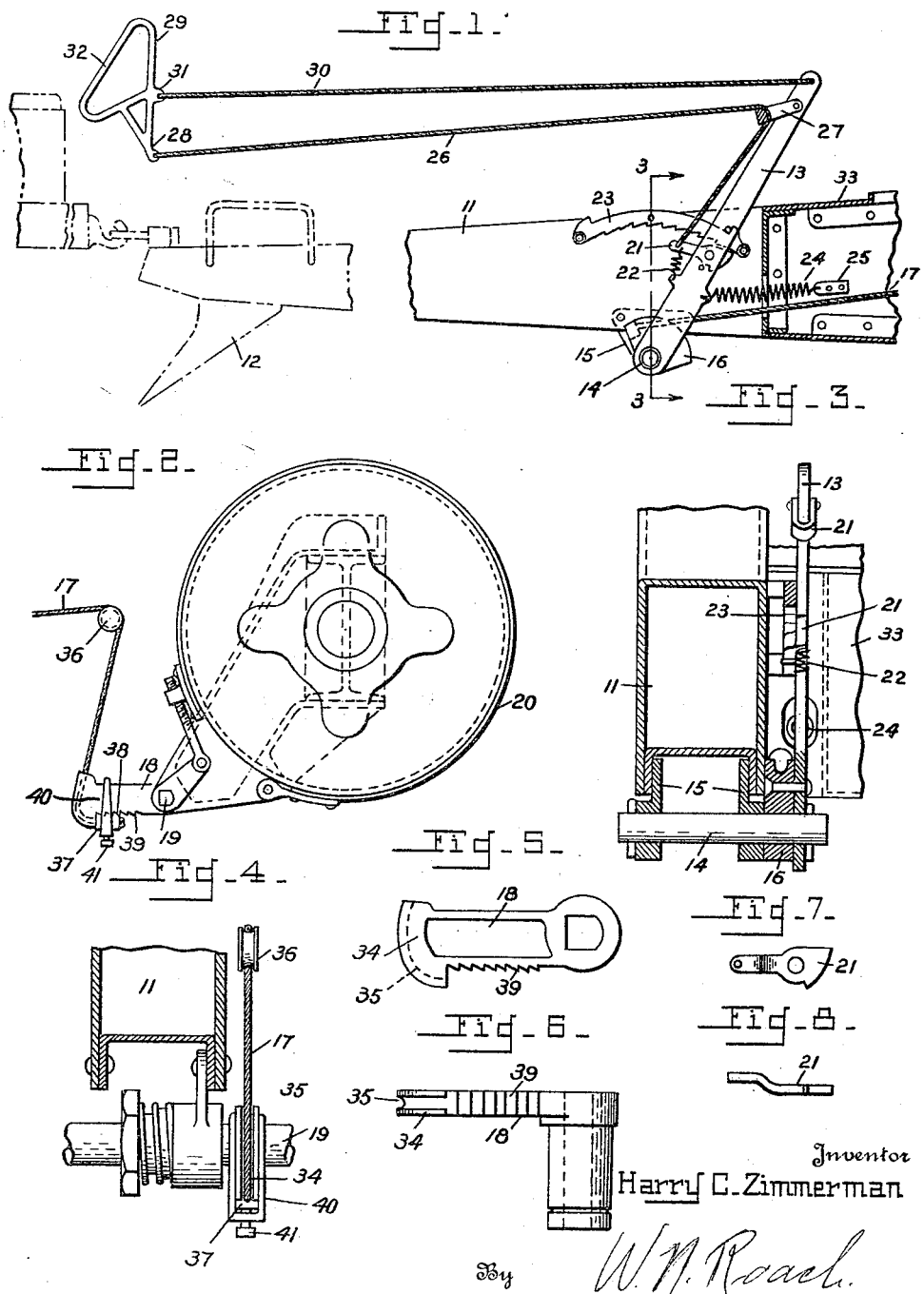
Inventor
Harry C. Zimmerman
By W. N. Roach.
Attorney Patented Dec. 29, 1925.

1,567,221

UNITED STATES PATENT OFFICE.

HARRY C. ZIMMERMAN, OF WASHINGTON, DISTRICT OF COLUMBIA.

BRAKE CONTROL.

Application filed September 30, 1924. Serial No. 740,859.

(GRANTED UNDER THE ACT OF MARCH 3, 1883; 22 STAT. L. 625.)

*To all whom it may concern:*

Be it known that I, HARRY C. ZIMMERMAN, a citizen of the United States, and a resident of Washington, District of Columbia, have invented an Improvement in Brake Controls, of which the following is a specification.

The invention described herein may be used by the Government, or any of its officers or employees in prosecution of work for the Government, or by any other person in the United States, without payment to me of any royalty thereon, in accordance with the act of March 3, 1883.

The subject of this invention is a brake control.

Brake systems for wheeled gun carriages usually include a hand lever for actuating the brake mechanism to lock the wheels during firing and also a foot lever for use from the axle seat when the carriage is hooked to its limber in traveling. Both of the control levers are positioned near the axle thereby occupying the restricted space required for the operative elements of the gun and also rendering it necessary to burden the gun carriage with a seat from which the operator may control the brake when traveling.

In trailing heavy vehicles of this type it is advantageous and desirable to control the brakes from a position on the preceeding vehicle. The object of the present invention is to provide a single control for the gun carriage brakes which is positioned at the rear of the trail and which may be operated by one of the gunners riding on the limber.

To these and other ends, my invention consists in the construction, arrangement, and combination of elements, described hereinafter and pointed out in the claims forming a part of this specification.

A practical embodiment of my invention is illustrated in the accompanying drawing, in which, Fig. 1 is a view in side elevation of the rear end of the far trail beam showing the position of the brake control with relation to a limber;

Fig. 2 is a similar view of the brake and crank arm;

Fig. 3 is a sectional view taken on the line 3—3 of Fig. 1;

Fig. 4 is a transverse sectional view taken through the far trail and showing the crank in rear elevation;

Fig. 5 is a detail side elevation of the crank;

Fig. 6 is a bottom view thereof;

Fig. 7 is a detail side elevation of the catch; and

Fig. 8 is a plan view thereof.

Referring to the drawing by numerals of reference:

According to the invention, the brake control is located preferably on the inside of one of the trail beams 11 in front of the spade 12 and comprises a lever 13, fulcrumed on a pin 14 journaled in brackets 15 on the trail. Secured to the lever and also mounted on the pin 14 is a quadrantal grooved block 16 to which is secured one end of a cable 17 leading to a crank 18 on the brake shaft 19 and providing means for operating the brake bands 20.

Pivoted to the lever is a catch 21, its rear end connected by a spring 22 to the lever for the purpose of normally holding the catch into engagement with a segmental rack 23 fixed to the trail. The lever is normally held in released position by a coil spring 24 secured to a retainer 25 fixed to the trail.

The catch 21 is moved about its pivot against the action of the spring 22 by means of a flexible cable 26 passing through a guide hanger 27 on the lever and secured to the arm 28 of a handle 29.

A similar cable 30 connects the lever and handle and is secured to the handle at a point 31 central to its grip 32 so that in pulling the handle to retract the lever and actuate the brake bands the operator's grasp thereon will normally tend to slacken the release cable 26 and permit the catch to ride over the rack, being held thereagainst by its spring 22 and serving to hold the lever in operative position.

In releasing the lever the operator by adducting his hand in the direction of the arm draws the release cable taut until the catch is disengaged from the rack whence the spring 24 is free to return the lever to initial released position.

When not in use the handle 29 and the cable may be placed in the tool box 33 provided between the trail beams.

The cables are of sufficient length to conveniently reach to the operator's seat on the limber.

The crank 18 is formed with a curved head 34 grooved as at 35 to receive the cable 17, trained through a pulley 36 and secured in a block 37 having a serrated upper face 38 adapted to engage the serrated lower face 39 of the crank 18. A clip 40 embracing the crank 18 and block 37 is provided with a screw 41 for holding the block in locked engagement with the crank.

By adjusting the position of the block on the crank arm a convenient take-up is provided to compensate for stretching of the cable and to keep the movement of the brake lever 13 within the arc of its easiest and most effective use.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. Means for operating a plurality of flexible connections embodying a handle having a grip portion, means formed on said handle centrally with respect to the grip portion for attachment of one cable and an angularly disposed arm on said handle extending beyond the path of rotation of said central portion for attachment of another cable.

2. Means for operating a plurality of flexible connections embodying a handle formed for the attachment of said connections at points unequally distant from and divergent with respect to the grip portion of said handle.

HARRY C. ZIMMERMAN.